United States Patent
Boyes et al.

(10) Patent No.: US 9,267,552 B2
(45) Date of Patent: Feb. 23, 2016

(54) CLUTCHED DRIVEN DEVICE AND ASSOCIATED CLUTCH MECHANISM

(71) Applicant: Litens Automotive Partnership, Woodbridge (CA)

(72) Inventors: Andrew M. Boyes, Aurora (CA); Ivan Ferlik, Richmond Hill (CA)

(73) Assignee: Litens Automotive Partnership, Woodbridge, ON (CA)

( * ) Notice: Subject to any disclaimer, the term of this patent is extended or adjusted under 35 U.S.C. 154(b) by 0 days.

(21) Appl. No.: 14/349,423

(22) PCT Filed: Oct. 1, 2012

(86) PCT No.: PCT/CA2012/000916
§ 371 (c)(1),
(2) Date: Apr. 3, 2014

(87) PCT Pub. No.: WO2013/049919
PCT Pub. Date: Apr. 11, 2013

(65) Prior Publication Data
US 2014/0238809 A1    Aug. 28, 2014

Related U.S. Application Data

(60) Provisional application No. 61/544,015, filed on Oct. 6, 2011, provisional application No. 61/601,611, filed on Feb. 22, 2012.

(51) Int. Cl.
*F16D 13/12*    (2006.01)
*F16D 27/105*    (2006.01)
(Continued)

(52) U.S. Cl.
CPC . *F16D 13/12* (2013.01); *F01P 5/12* (2013.01); *F02B 67/06* (2013.01); *F16D 27/105* (2013.01)

(58) Field of Classification Search
CPC ....... F16D 13/12; F16D 13/025; F16D 13/08; F16D 27/105; F16D 27/025; F16D 27/14; F02B 67/06; F01P 5/12
See application file for complete search history.

(56) References Cited

U.S. PATENT DOCUMENTS 2,975,648 A    3/1961 Doerries
3,019,871 A    2/1962 Sauzedde
(Continued)

FOREIGN PATENT DOCUMENTS

CN    1490536 A    4/2004
CN    101140017 A    3/2008
(Continued)

OTHER PUBLICATIONS

Warner Electric—Wrap Spring Clutch Catalog—p. 1310, Jan. 7, 2011, Warner Electric.
(Continued)

*Primary Examiner* — Jacob S Scott
(74) *Attorney, Agent, or Firm* — Millman IP Inc.

(57) ABSTRACT

A driven accessory (10) is provided that includes a first rotary clutch portion (50), a second rotary clutch portion (52), a wrap spring (56) and an actuator (60). The wrap spring (56) is configured to transmit rotary power between the first and second rotary clutch portions (50, 52). The actuator (60) is selectively operable for generating a drag force that is applied to the wrap spring (56) to control torque transmission through the wrap spring (56). The actuator (60) includes an actuator input member (140), a brake shoe (144) and a motor (142) that is configured to translate the brake shoe (144) axially along the rotary axis (70). The drag force is generated when the motor (142) is operated in a first mode so that transmission of rotary power between the first rotary clutch portion (50) and the second rotary clutch portion (52) is interrupted.

20 Claims, 11 Drawing Sheets

(51) Int. Cl.
  *F02B 67/06* (2006.01)
  *F01P 5/12* (2006.01)

(56) References Cited

U.S. PATENT DOCUMENTS

| | | | |
|---|---|---|---|
| 3,637,056 | A | 1/1972 | Baer |
| 3,865,222 | A | 2/1975 | Briar |
| 4,201,281 | A | 5/1980 | MacDonald |
| 5,722,909 | A | 3/1998 | Thomey |
| 6,083,130 | A | 7/2000 | Mevissen et al. |
| 7,007,780 | B2 | 3/2006 | Arnold et al. |
| 7,153,227 | B2 | 12/2006 | Dell et al. |
| 7,207,910 | B2 | 4/2007 | Dell et al. |
| 7,591,357 | B2 | 9/2009 | Antchak |
| 7,618,337 | B2 | 11/2009 | Jansen et al. |
| 7,624,852 | B2 | 12/2009 | Mevissen |
| 7,708,661 | B2 | 5/2010 | Pflug et al. |
| 7,712,592 | B2 | 5/2010 | Jansen et al. |
| 7,985,150 | B2 | 7/2011 | Kamdem |
| 2004/0020737 | A1 | 2/2004 | Webber |
| 2005/0230210 | A1 | 10/2005 | Arnold et al. |
| 2006/0240926 | A1 | 10/2006 | Wiesneth et al. |
| 2008/0041686 | A1 | 2/2008 | Hoshino et al. |
| 2010/0038203 | A1 | 2/2010 | Wheals |
| 2010/0122882 | A1 | 5/2010 | Komorowski et al. |
| 2013/0175134 | A1* | 7/2013 | Boyes et al. ............ 192/75 |

FOREIGN PATENT DOCUMENTS

| | | | |
|---|---|---|---|
| DE | 10037942 | A1 | 3/2001 |
| DE | 10350698 | A1 | 6/2004 |
| EP | 1764524 | A1 | 3/2007 |
| GB | 1480676 | A | 7/1977 |
| JP | 06159393 | A | 6/1994 |
| WO | 03104673 | A1 | 12/2003 |
| WO | 2008044058 | A1 | 4/2008 |
| WO | 2009118834 | A1 | 10/2009 |
| WO | 2010048732 | A1 | 5/2010 |
| WO | 2010054487 | A1 | 5/2010 |
| WO | 2010099605 | A1 | 9/2010 |
| WO | 2011072391 | A1 | 12/2010 |
| WO | 2012024790 | A2 | 3/2012 |

OTHER PUBLICATIONS

Search Report and Written Opinion for PCT/CA2012/000916, Jan. 28, 2013, ISA.
International Preliminary Report on Patentability for PC/CA2012/000916, Apr. 17, 2014, ISA.
Borg Warner Transmission Group Clutch Bearing Designs, Date Unknown, Borg Warner Inc.
InstaSPIN Bldc Motor Control Lab, Date Unknown, Texas Instruments.
Halbach Array Motor, Date Unknown, Launchpoint Technologies.
UTS—12VDC Frameless Ring Motors, Date Unknown, Applimotion.
First Office Action for CN201280049474, Oct. 10, 2015, SIPO.
Unofficial English Translation of First Office Action for CN201280049474 dated Oct. 10, 2015, SIPO.

* cited by examiner

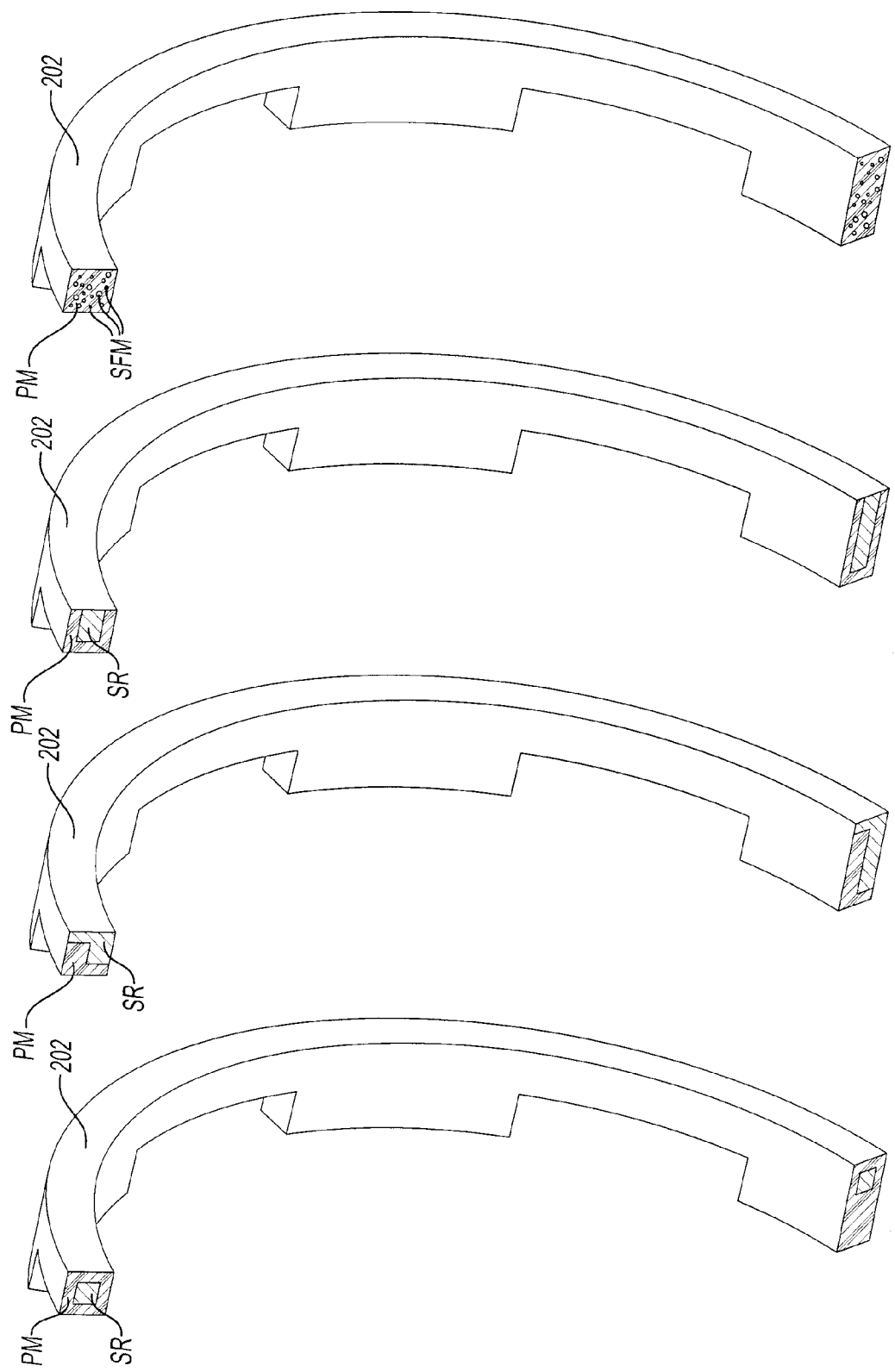

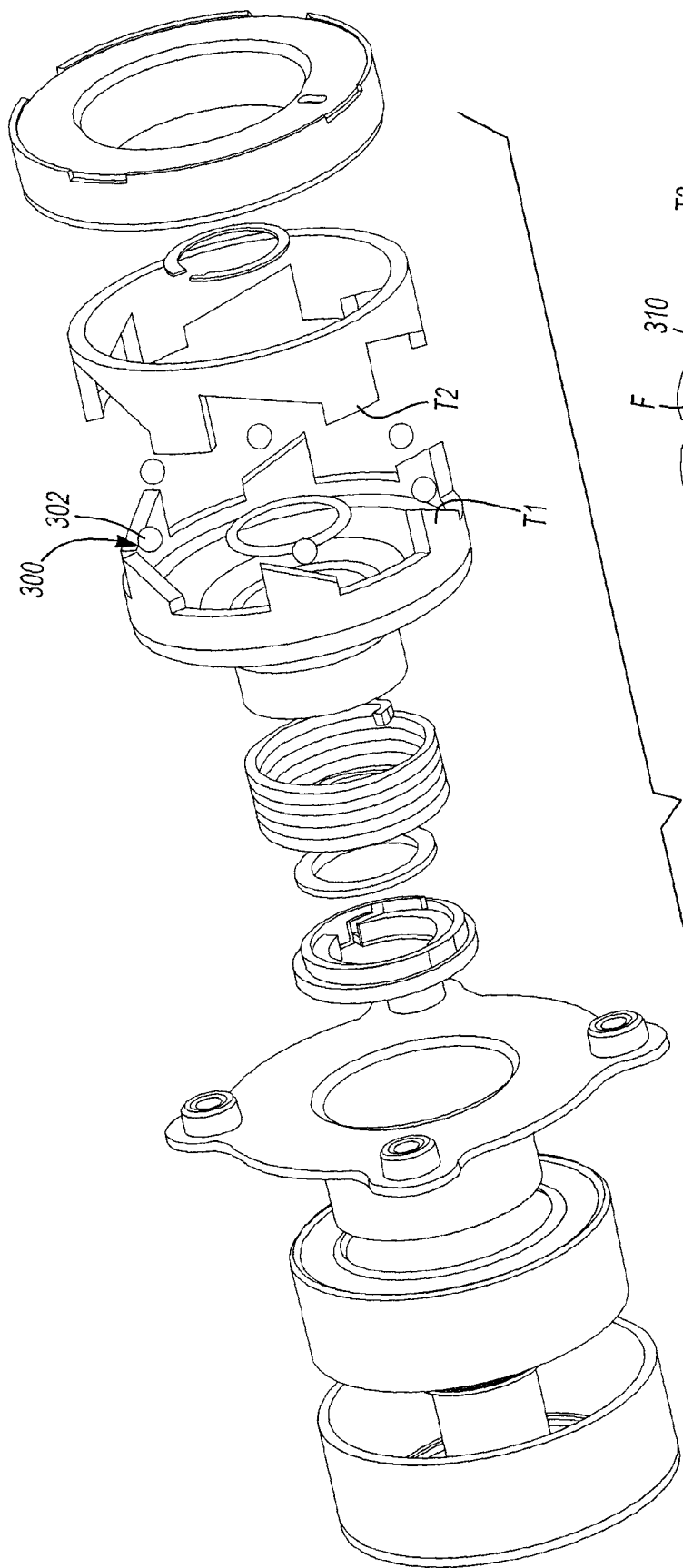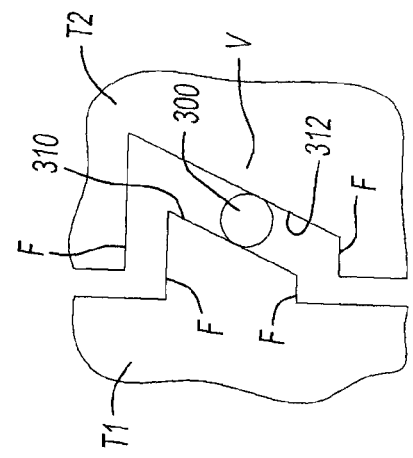
Fig-14
Fig-15

CLUTCHED DRIVEN DEVICE AND ASSOCIATED CLUTCH MECHANISM

CROSS-REFERENCE TO RELATED APPLICATIONS

This application claims the benefit of U.S. Provisional Application No. 61/544,015 filed Oct. 6, 2011 and U.S. Provisional Application No. 61/601,611 filed Feb. 22, 2012. Each of the aforementioned applications is incorporated by reference as if fully set forth in detail herein.

FIELD

The present disclosure relates to a clutched driven device and an associated clutch mechanism.

BACKGROUND

This section provides background information related to the present disclosure which is not necessarily prior art.

It is often desired to power a device with rotary power that is transmitted from a prime mover either directly or through an endless power transmitting element, which could employ a belt, a chain and/or a toothed gear. Such devices could, for example be connected to the engine of a motor vehicle via an accessory drive or a timing drive and could include a pump (e.g., water pump, vacuum pump, power steering pump, air compressor, air conditioning compressor), a means for generating electricity (e.g., alternator, generator, starter-alternator, starter-generator), and/or a fan, for example.

It will be appreciated that in situations when the output of the device is not needed or desired, operation of the device will be associated with reduced efficiency of the prime mover. In an automotive context for example, it may not be necessary to operate the engine water pump when the engine is cold and is being started and as such, the operation of the engine water pump when the engine is cold and being started reduces the overall fuel efficiency of the engine. To overcome this drawback, it was known in the art to provide a clutch to selectively operate the device. Such clutches typically required some sort of power, usually electrical power, to permit rotary power to be transmitted through the clutch to drive the device. More recently, several types of clutches have been developed by Litens Automotive Partnership that can be configured to transmit rotary power to a driven device in a normal or unpowered state and inhibit transmission of rotary power to the driven device in a power state that uses a relatively low-power input.

While such clutches are suitable for their intended purposes, such clutches are nonetheless susceptible to improvement.

SUMMARY

This section provides a general summary of the disclosure, and is not a comprehensive disclosure of its full scope or all of its features.

In a first aspect of the present disclosure, a driven accessory (10) is provided that includes a first rotary clutch portion (50), a second rotary clutch portion (52), a wrap spring (56) and an actuator (60). The first rotary clutch portion (50) is disposed about a rotary axis (70) and is configured to receive a rotary input. The first rotary clutch portion (50) defines a clutch surface (76). The second rotary clutch portion (52) is disposed about the rotary axis (70) and is configured to be coupled to an input shaft (40). The wrap spring (56) has a first end (110), a second end (112) and a plurality of helical coils (114) between the first end (110) and the second end (112) that engage the clutch surface (76). The wrap spring (56) is configured to selectively transmit rotary power between the first rotary clutch portion (50) and the second rotary clutch portion (52) such that the rotary power is received by the helical coils (114) from the first rotary clutch portion (50) and is transmitted through the first end (110). The actuator (60) is selectively operable for generating a drag force that is applied to the second end (112) of the wrap spring (56). The actuator (60) includes an actuator input member (140) and a brake shoe (144). The actuator input member (140) is rotatable about the rotary axis (70) relative to the first rotary clutch portion (50) and has a brake rotor (152) with a plurality of first teeth (T1) that are disposed circumferentially about the brake rotor (152). The brake shoe (144) includes a plurality of mating teeth (T2) that are meshingly engaged to the teeth (T1) of the brake rotor (152). The brake shoe (144) is rotatable about and axially movable along the rotary axis (70).

In a second aspect of the present disclosure, a driven accessory (10) is provided that includes a first rotary clutch portion (50), a second rotary clutch portion (52), a wrap spring (56) and an actuator (60). The first rotary clutch portion (50) is disposed about a rotary axis (70) and is configured to receive a rotary input, the first rotary clutch portion (50) defining a clutch surface (76). The second rotary clutch portion (52) is disposed about the rotary axis (70) and is configured to be coupled to an input shaft (40). The wrap spring (56) has a first end (110), a second end (112) and a plurality of helical coils (114) between the first end (110) and the second end (112) that engage the clutch surface (76). The wrap spring (56) is configured to selectively transmit rotary power between the first rotary clutch portion (50) and the second rotary clutch portion (52) such that the rotary power is received by the helical coils (114) from the first rotary clutch portion (50) and is transmitted through the first end (110). The actuator (60) is selectively operable for generating a drag force that is applied to the second end (112) of the wrap spring (56). The actuator (60) includes an actuator input member (140), a brake shoe (144) and a motor (142). The actuator input member (140) is rotatable about the rotary axis (70) relative to the first rotary clutch portion (50) and has a brake rotor (152). The brake shoe (144) is rotatable about and movable axially along the rotary axis (70). The motor (142) is selectively operable to translate the brake shoe (144) axially along the rotary axis (70). The drag force is generated when the motor (142) is operated in a first mode so that transmission of rotary power between the first rotary clutch portion (50) and the second rotary clutch portion (52) is interrupted. The drag force is not generated when the motor (142) is operated in a second mode to permit transmission of rotary power between the first rotary clutch portion (50) and the second rotary clutch portion (52).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 7, 7A, 7B and 8 are perspective section views of portions of alternately configured actuators that could be employed in the driven accessory of FIG. 1;

FIG. 14 is an exploded perspective view of a second driven accessory constructed in accordance with the teachings of the present disclosure;

FIG. 15 is a top plan view of a portion of the driven accessory of FIG. 14;

Corresponding reference numerals indicate corresponding parts throughout the several views of the drawings.

DETAILED DESCRIPTION

Figure 1:
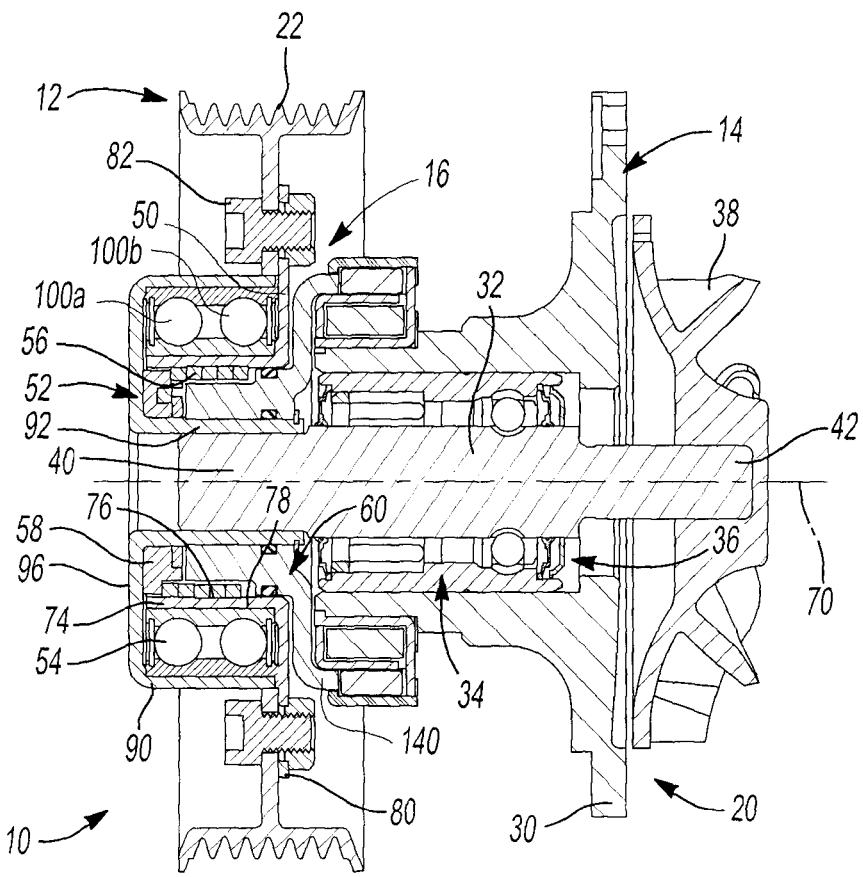
FIG. 1 is a longitudinal section view of a driven accessory constructed in accordance with the teachings of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
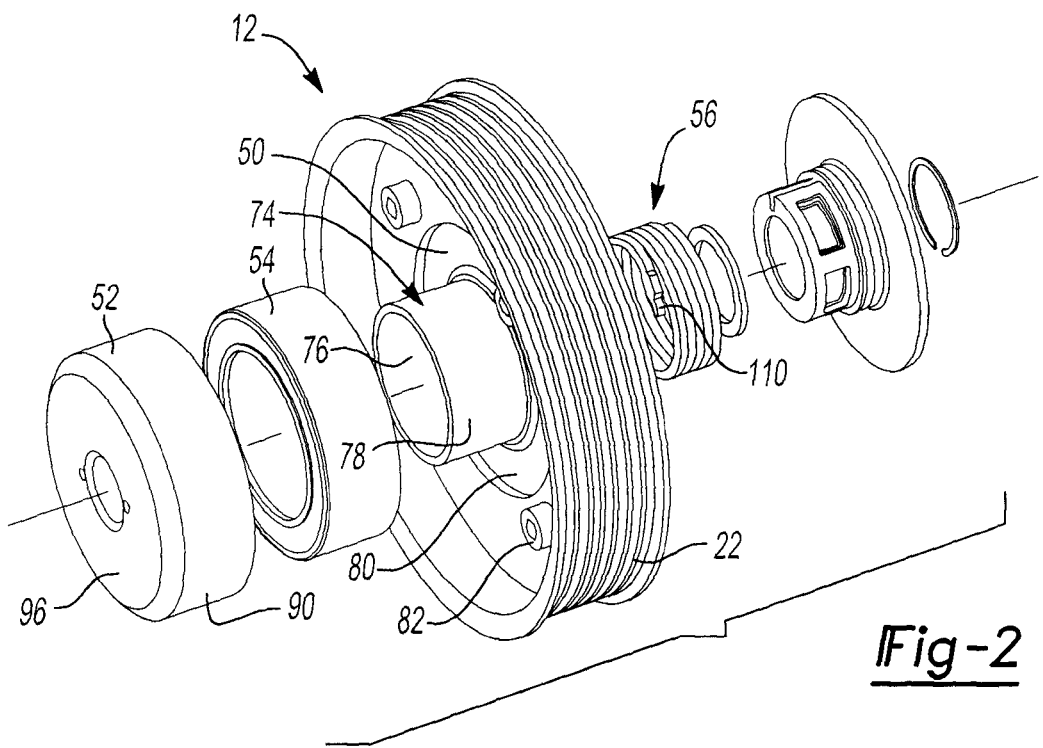
FIG. 2 is a front exploded perspective view of a portion of the driven accessory of FIG. 1.

With reference to FIGS. 1 and 2 of the drawings, a clutched driven device or accessory constructed in accordance with the teachings of the present disclosure is generally indicated by reference numeral 10. The clutched driven device 10 can comprise an input member 12, a substantially conventional accessory portion 14 and a clutch assembly 16. In the particular example provided, the accessory portion 14 is a water pump assembly 20, but those of skill in the art will appreciate that the depiction of a water pump assembly 20 is merely illustrative of one application of the present teachings and that the present teachings have application to various other types of engine accessories, such as fans, means for generating electricity (e.g., alternators, generators, starter-alternators, starter-generators), other types of pumps (e.g., air conditioning compressors, power steering pumps, vacuum pumps, air compressors), blowers, super chargers, power-take offs and accessories that are driven by other power sources, including motors (e.g., electrically-power or fluid-powered motors). Moreover, while the present teachings are depicted in an automotive or vehicle context, it will be appreciated that the teachings of the present disclosure have application to drive systems (i.e., systems for transferring motion, including systems that transfer rotary motion) generally.

The input member 12 can be configured to receive rotary power from an endless power transmitting member. Examples of various endless power transmitting members includes belts, chains, and gears. In the particular example provided, the input member 12 comprises a pulley sheave 22 that is configured to receive rotary power from a belt (not shown).

The water pump assembly 20 can include a housing 30, an input shaft 32, a bearing set 34, a seal system 36 and an impeller 38. The housing 30 can be configured to mount the clutched driven device 10 to a prime mover, such as an engine. The input shaft 32 can include an input end 40 and an output end 42 that is located opposite the input end 40. The bearing set 34 can be disposed between the housing 30 and the input shaft 32 and can support the input shaft 32 for rotation relative to the housing 30. The seal system 36 can comprise one or more sets of seals that are configured to inhibit ingress of contamination (e.g., dirt, debris, moisture) into the bearing set 34 and/or egress of lubrication from the bearing set 34. The impeller 38 can be fixedly coupled to the output end 42 of the input shaft 32 for rotation therewith.

Figure 3:
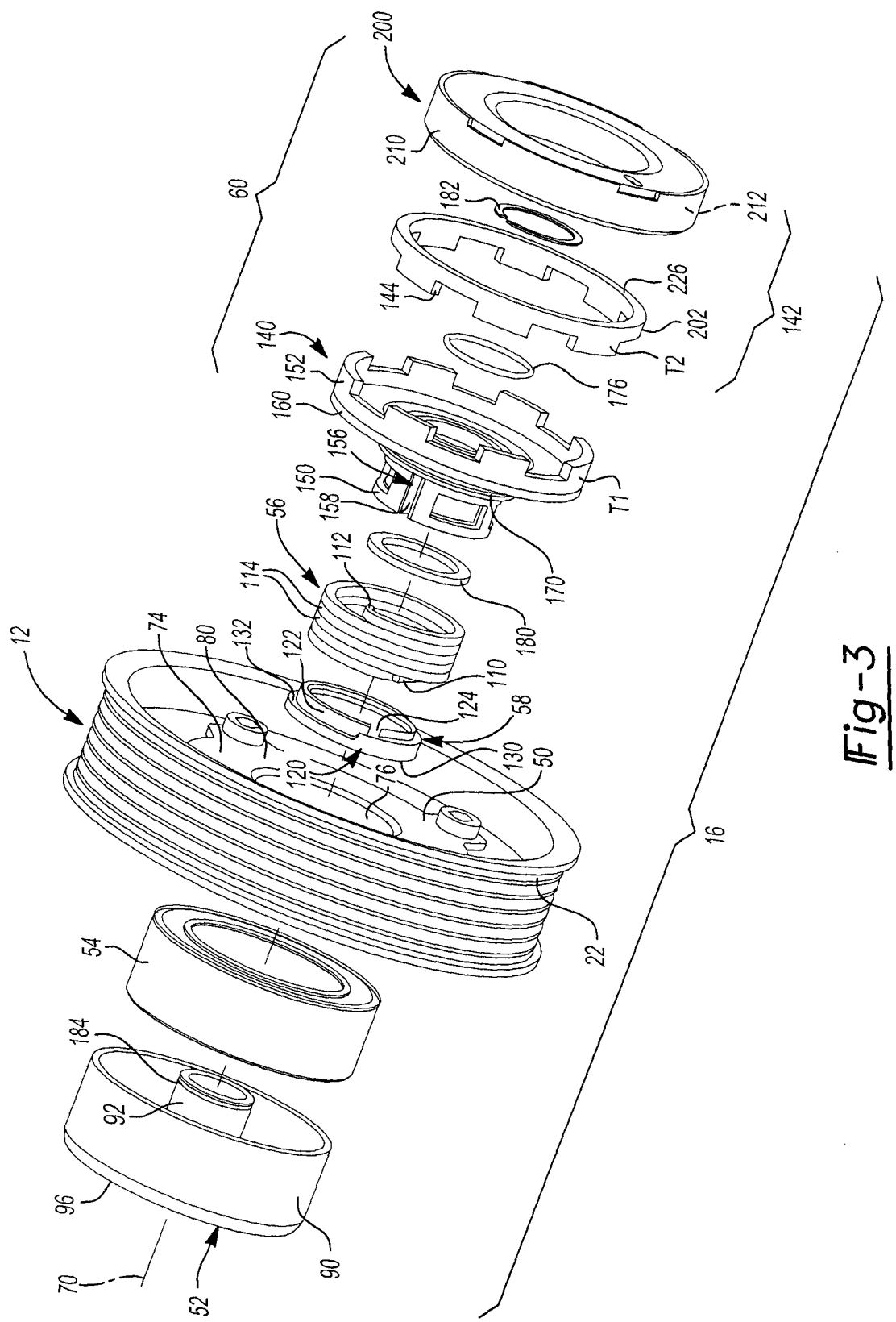
FIG. 3 is a rear exploded perspective view of a portion of the driven accessory of FIG. 1.

With reference to FIGS. 1 through 3, the clutch assembly 16 can comprise a first rotary clutch portion 50, a second rotary clutch portion 52, a bearing 54, a wrap spring 56, a carrier 58 and an actuator 60.

The first rotary clutch portion 50 can be configured to be coupled to the input member 12 for rotation therewith about a rotary axis 70. The first rotary clutch portion 50 can have a drive member 74 with an interior clutch surface 76. In the particular example provided, the first rotary clutch portion 50 comprises a tubular hub 78 and a radial flange 80 that is fixedly coupled to and extends radially outwardly from a rear end of tubular hub 78. The interior clutch surface 76 can be formed on an inside circumferential surface of the tubular hub 78 so that it is concentrically disposed about the rotary axis 70. The radial flange 80 can be fixedly coupled to the input member 12 in any desired manner, such as welds or threaded fasteners 82. As another example, the radial flange 80 can be integrally and unitarily formed with the input member 12 (i.e., as a one-piece component).

The second rotary clutch portion 52 can be configured to transmit rotary power to the input shaft 32 of the water pump assembly 20. In the particular example provided, the second rotary clutch portion 52 comprises an outer annular wall 90, an inner annular wall 92, at least one drive lug 94 (FIG. 4) and an end wall 96 that connects the outer and inner annular walls 90 and 92 to one another. The outer annular wall 90 can be disposed concentrically about the tubular hub 78 of the first rotary clutch portion 50, while the inner annular wall 92 can be disposed concentrically within the tubular hub 78. The inner annular wall 92 can be non-rotatably coupled to the input end 40 of the input shaft 32 in any desired manner, such as an interference fit, a weld, spline teeth and/or a threaded fastener. The drive lug(s) 94 (FIG. 4) can be coupled to one or more of the outer annular wall 90, the inner annular wall 92 and the end wall 96 for rotation therewith. In the particular example provided, the drive lugs 94 are co-formed with the inner annular wall 92 and the end wall 96 but it will be appreciated, however, that the drive lugs 94 could be formed on another structure, such as a thrust washer, that is assembled to (and non-rotatably coupled to) one or more of the outer annular wall 90, the inner annular wall 92 and the end wall 96.

The bearing 54 can be received between the first and second rotary clutch portions 50 and 52 and can support the first rotary clutch portion 50 for rotation about the second rotary clutch portion 52. In the example provided, the bearing 54 is engaged to a radially inside surface of the outer annular wall 90 and a radially outside surface of the tubular hub 78. The bearing 54 can be any type of bearing, but in the example provided is a sealed bearing having two rows of bearing elements 100a, 100b that are spaced axially apart from one another along the rotary axis 70.

Figure 6:
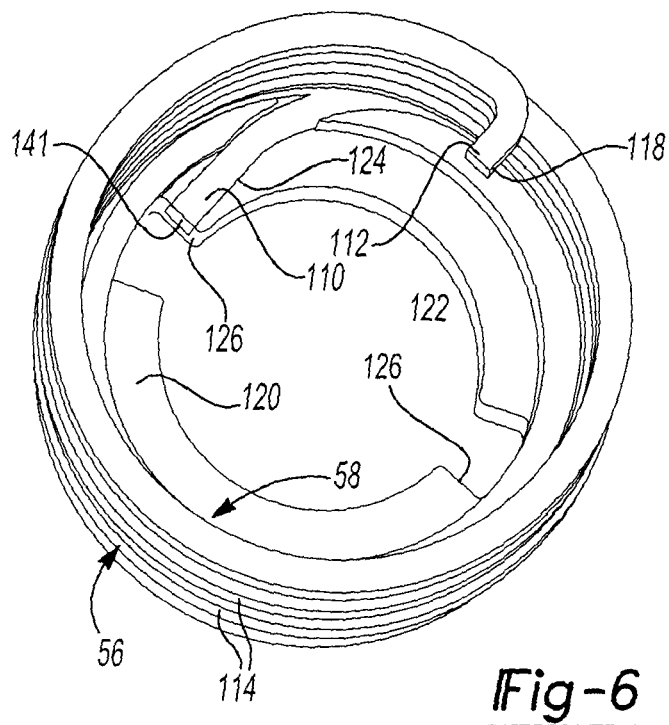
FIG. 6 is a rear perspective view of a portion of the driven accessory of FIG. 1 illustrating a wrap spring and a carrier in more detail.
Figure 5:
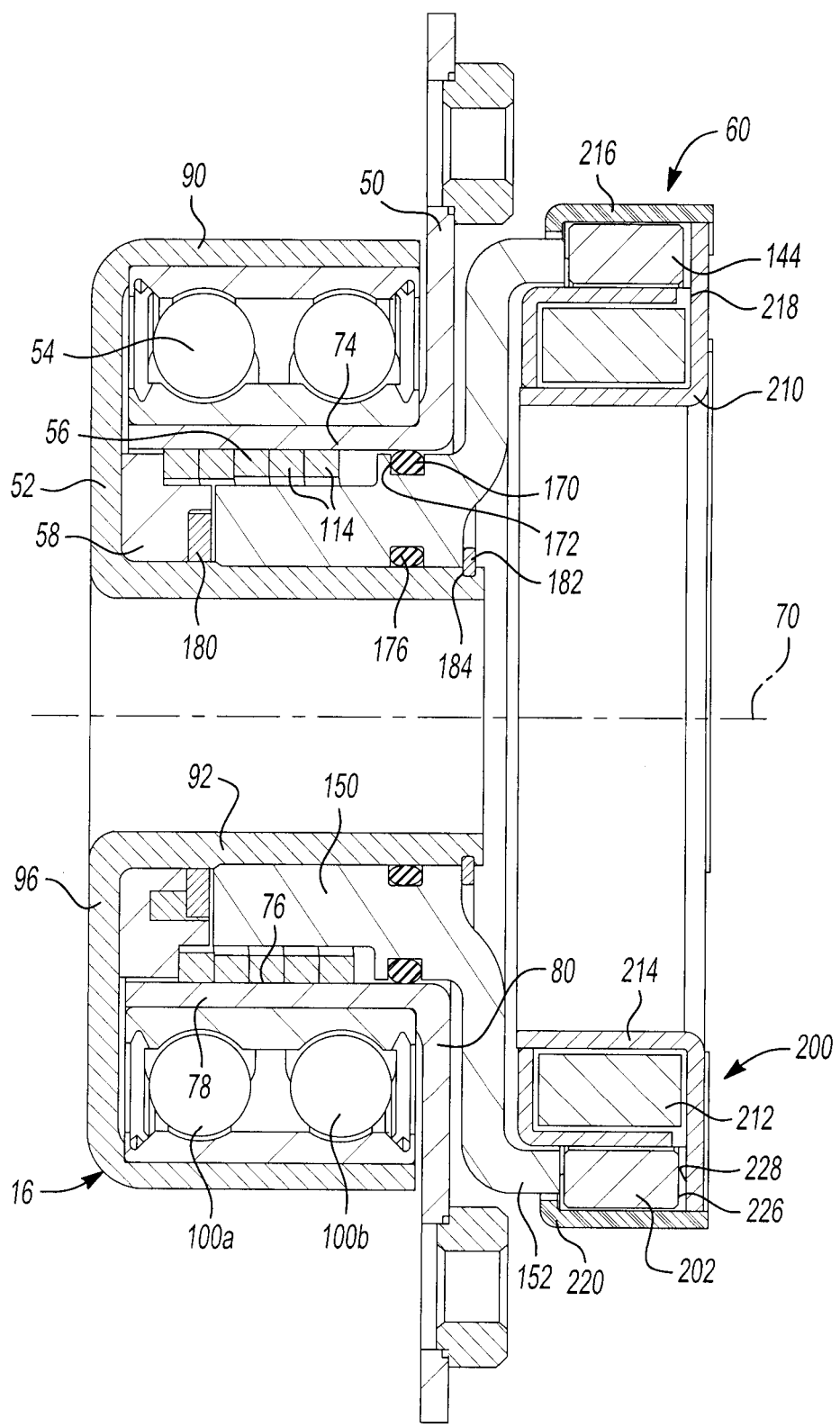
FIG. 5 is a longitudinal section view of a portion of the driven accessory of FIG. 1.

With reference to FIGS. 3, 5 and 6, the wrap spring 56 can be formed of an appropriate wire, which can have a generally square or rectangular cross-sectional shape. The wire that forms the wrap spring 56 can be uncoated (i.e., plain) or could be coated with a suitable material that can, for example, help to control friction, wear, and/or heat. The wrap spring 56 can be disposed radially inwardly of the bearing 54 and can have a first end 110, a second end 112 that is opposite to the first end 110, and a plurality of helical coils 114 that can extend between the first and second ends 110 and 112. The helical coils 114 can be received against the interior clutch surface 76. In the particular example provided, the helical coils 114 are press-fit to the interior clutch surface 76 but it will be appreciated that other types of fits may be employed in the alternative. Moreover, it will be appreciated that all of the helical coils 114 need not be fitted to the interior clutch surface 76 in the same manner. For example, some of the helical coils 114 may employ an interference, while there may be clearance or varying levels of interference between the remaining helical coils and the interior clutch surface 76. The first end 110 can be configured to transmit rotary power from the helical coils 114 to the second rotary clutch portion 52 as will be discussed in more detail, below. The second end 112 can include a control tang 118 that can be coupled to the actuator 60 as will be discussed in more detail below.

Figure 4:
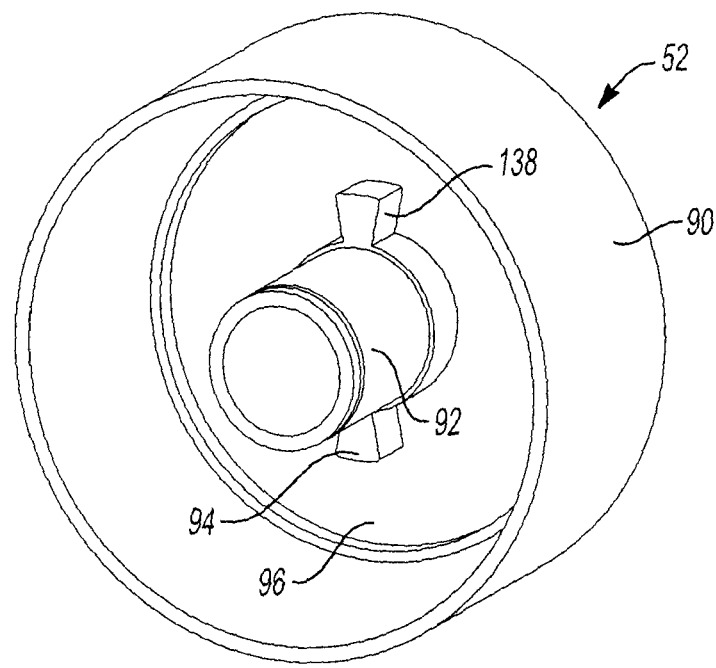
FIG. 4 is a perspective view of a portion of the driven accessory of FIG. 1 illustrating a second rotary clutch portion in more detail.

The carrier 58 can be formed of a suitable material, such as steel or plastic, and can comprise a flange portion 120, a sleeve portion 122, a groove 124 and a carrier abutment wall 126. The flange portion 120 can be an annular structure having a front surface 130, which can abut the end wall 96 of the second rotary clutch portion 52, and a rear surface 132 that can abut the adjacent one of the helical coils 114 of the wrap spring 56. In the example provided, portion of the rear surface 132 that abuts the wrap spring 56 is helically shaped to match the contour of the helical coils 114 of the wrap spring 56. The sleeve portion 122 can be an annular structure that can extend axially from the flange portion 120. The sleeve portion 122 can be sized to be received in the helical coils 114 of the wrap spring 56 to support one or more of the helical coils 114 and/or to maintain the carrier 58 and the first end 110 of the wrap spring 56 about the rotary axis 70. The groove 124 can be configured to receive the first end 110 of the wrap spring 56 and can extend through the circumference of the sleeve portion 122 and optionally through the carrier abutment wall 126. The carrier abutment wall 126 can abut an abutting face 138 (FIG. 4) on one of the drive lugs 94 on the second rotary clutch portion 52 and if the groove 124 extends through the carrier abutment wall 126 (as is shown in the example provided), an axial end face 141 of the wire that forms the wrap spring 56 can also abut the abutting face 138 (FIG. 4) on the one of the drive lugs 94 (FIG. 4).

With reference to FIGS. 1, 3 and 5, the wrap spring 56 can be wound such that the helical coils 114 tend to uncoil or expand radially outwardly when rotary power is transmitted through the clutch assembly 16. More specifically, rotation of the input member 12 can cause corresponding rotation of the drive member 74, which in turn can tend to rotate the wrap spring 56 due to engagement of the helical coils 114 with the interior clutch surface 76. Rotary power input to the wrap spring 56 can be transmitted to the second rotary clutch portion 52 (via the first end 110 of the wrap spring 56 and/or the carrier 58), which will tend to rotate the input shaft 32 of the accessory portion 14. Because the input shaft 32 of the accessory portion 14 does not spin without resistance (rotation of the input shaft 32 permits the accessory portion 14 to produce work), the helical coils 114 of the wrap spring 56 tend to uncoil or expand radially outwardly to better grip the interior clutch surface 76. Accordingly, this example of the clutch assembly 16 is self-activating.

With reference to FIGS. 1, 3 and 5, the actuator 60 can be configured to selectively initiate coiling of the wrap spring 56 to cause the helical coils 114 to at least partly disengage the interior clutch surface 76. More specifically, actuation of the actuator 60 can pull on the second end 112 of the wrap spring 56 to cause one or more of the helical coils 114 to coil more tightly or contract radially inwardly. In the example provided, the actuator 60 comprises an actuator input member 140, a drive motor 142 and a brake shoe 144.

The actuator input member 140 can comprise a hub member 150 and a brake rotor 152. The hub member 150 can be a tubular structure that can be received between the inner annular wall 92 of the second rotary clutch portion 52 and the tubular hub 78. The hub member 150 can have a spring mount 156 that can engage the second end 112 of the wrap spring 56. In the present example, the spring mount 156 comprises a longitudinally extending slot 158 that is formed in the hub member 150. The tang 118 (FIG. 6) on the second end 112 of the wrap spring 56, which can extend radially inwardly from an adjacent one of the helical coils 114, can be received into the slot 158 so that rotation of the actuator input member 140 in a predetermined direction relative to the second end 112 of the wrap spring 56 causes coiling of the helical coils 114. The brake rotor 152 can be an annular structure that can be coupled to the hub member 150 extend radially outwardly therefrom. The brake rotor 152 can have a rotor surface 160 that can be defined by a plurality of teeth T1 that can extend axially rearward toward the drive motor 142.

The actuator input member 140 can be configured to rotate about the rotary axis 70 substantially with the first rotary clutch portion 50 such that the actuator input member 140 rotates with or lags slightly behind the first rotary clutch portion 50 as will be discussed in more detail below. Any desired means may be employed to couple the actuator input member 140 to the first rotary clutch portion 50 in a way that permits limited rotation of the actuator input member 140 relative to the first rotary clutch portion 50. For example, receipt of the tang 118 (FIG. 6) on the second end 112 of the wrap spring 56 into the slot 158 can provide sufficient rotational coupling of the actuator input member 140 to the first rotary clutch portion 50 to cause the actuator input member 140 to substantially rotate with the first rotary clutch portion 50. In the particular example provided, however, a frictional interface is provided between the first rotary clutch portion 50 and the actuator input member 140 that creates a drag force that tends to drive the actuator input member 140 as the first rotary clutch portion 50 rotates, as well as helps to "energize" the helical coils 114 so that they uncoil/expand radially to further engage the interior clutch surface 76. In the particular example provided, an O-ring seal 170, which is received in a seal groove 172 formed in the hub member 150, frictionally engages both the first rotary clutch portion 50 and the hub member 150. If desired, one or more seals may be employed to seal the cavity between the first and second rotary clutch portions 50 and 52 into which the wrap spring 56 is disposed. In the particular example provided, a second O-ring seal 176 seals an interface between the inner annular wall 92 of the second rotary clutch portion 52 and the hub member 150, while the O-ring seal 170 seals an interface between the hub member 150 and the tubular hub 78. It will be appreciated that any desired type of seal may be employed for one or both of the O-ring seals 170 and 176, such as a quad ring seal, an X ring seal, a lip seal, a dynamic seal, an overmold, etc. If desired, a suitable lubricant, such as a coating, a dry-film lubricant, a grease, oil and/or a traction fluid, can be employed to lubricate the helical coils 114 and the interior clutch surface 76.

To control axial endplay of the actuator input member 140 relative to the second rotary clutch portion 52 and/or to retain the carrier 58 and provide axial clamping force on the carrier 58 and the first end 110 of the wrap spring 56, various endplay control techniques can be employed. For example, a thrust ring 180 can be disposed between the second rotary clutch portion 52 and a front axial surface of the actuator input member 140 and a retaining ring 182, which can be received in a ring groove 184 in the second rotary clutch portion 52, can limit movement of the actuator input member 140 in an axial direction away from the end wall 96.

The drive motor 142 can comprise an electromagnetic coil 200 and an armature 202. The electromagnetic coil 200 can comprise a coil housing 210 and an annular coil of wire 212. The coil housing 210 can be an annular structure that can be non-rotatably mounted to the housing 30 (FIG. 1) of the accessory portion 14 (FIG. 1) in a desired location, such as concentrically about the input shaft 32 (FIG. 1). The coil housing 210 can comprise an inner housing wall 214, an outer housing wall 216 and a rear wall 218 that can be disposed radially between the inner and outer housing walls 214 and 216. The coil housing 210 can be configured to limit forward axial movement of the brake shoe 144. In the particular example provided, the forward end 220 of the outer housing wall 216 is rolled to create a lip that limits forward axial movement of the brake shoe 144.

The coil of wire 212 can be fixedly coupled to the coil housing 210 and can be disposed concentrically about the inner housing wall 214. In the particular example provided, the coil of wire 212 is potted in a cartridge that is fixedly coupled to the inner housing wall 214, for example via an interference fit or bonding (e.g., adhesive, cohesive). The coil of wire 212 can be energized to generate a magnetic field to move the armature 202 as will be discussed in more detail below.

The armature 202 can be a ring-shaped structure that can be received radially between the coil of wire 212 and the outer housing wall 216. The armature 202 can be formed (wholly or in part) of a ferromagnetic material, such as steel, while one or more portions of the coil housing 210, such as the outer housing wall 216, could be formed of a non-magnetic material, such as aluminum, stainless steel or plastic. As one example, the armature 202 could be partly formed of a plastic material PM into which a steel ring SR could be embedded (e.g., over-molded) as is shown in FIG. 7. As another example, the armature 202 could be formed of a material that comprises plastic PM with a steel filler material SFM as is shown in FIG. 8.

Returning to FIGS. 1, 3 and 5, the brake shoe 144 can be coupled to the armature 202 and can comprise a plurality of mating teeth T2. The mating teeth T2 can extend axially forward from the armature 202 and can meshingly engage the teeth T1 of the brake rotor 152 in a manner that generally inhibits relative rotation between the armature 202 and the actuator input member 140 (due to engagement of the mating teeth T2 with the teeth T1, which rotationally couples the brake shoe 144 to the actuator input member 140) while permitting axial movement of the brake shoe 144 relative to the actuator input member 140.

In operation, the electromagnetic coil 200 can be maintained or operated in an unenergized state so that a magnetic field is not produced and the armature 202 is permitted to rotate with the actuator input member 140 in a relatively unencumbered manner. When a signal is provided to the electromagnetic coil 200 to operate the electromagnetic coil 200 in an energized state, the coil of wire 212 can generate a magnetic field that can attract the armature 202 such that the armature 202 moves rearwardly toward the coil housing 210. It will be appreciated that rearward movement of the armature 202 will cause corresponding rearward movement of the brake shoe 144. The teeth T1 and mating teeth T2, however, can be configured to maintain engagement while accommodating the axial movement of the brake shoe 144.

The magnetic field generated by the electromagnetic coil 200 can cause contact between a rear surface 226 of the armature 202 and a front surface 228 of the portion of the rear wall 218 between the coil of wire 212 and the outer housing wall 216. Such contact between the rear surface 226 and the rear wall 218 can momentarily slow rotation of the armature 202 (relative to the first end 110 of the wrap spring 56). Since the brake shoe 144 is coupled to the armature 202 for rotation, the momentary slowing of the rotation of the armature 202 can also momentarily slow rotation of the brake shoe 144 relative to the first end 110 of the wrap spring 56. Since the mating teeth T2 are meshingly engaged to the teeth T1, the momentary slowing of the brake shoe 144 will cause the flanks of the mating teeth T2 to contact the flanks of the teeth T1, and thereafter the brake rotor 152 will be rotationally coupled to the brake shoe 144 such that the brake rotor 152 (and the remainder of the actuator input member 140) will slow relative to the first end 110 of the wrap spring 56. Since the tang 118 on the second end 112 of the wrap spring 56 is engaged to the actuator input member 140, the second end 112 of the wrap spring 56 will slow relative to the first end 110 of the wrap spring 56. The momentary slowing of the second end 112 of the wrap spring 56 can pull the second end 112 in a rotational direction that causes one or more of the helical coils 114 to coil or contract radially inwardly such that the wrap spring 56 disengages the interior clutch surface 76 to a predetermined extent to thereby limit or halt the transmission of torque between the first rotary clutch portion 50 and the second rotary clutch portion 52. In the present example, contact between the armature 202 and the coil housing 210 is configured to cause relative rotation of the brake rotor 152 relative to the first rotary clutch portion 50 through a limited angular offset while the brake rotor 152 continues to rotate with the first rotary clutch portion 50 (albeit in a slightly lagging behind condition defined by the angular offset). It will be appreciated, however, that if desired, contact between the brake shoe 144 and the rotor surface 160 could halt rotation of the brake rotor 152 such that the brake rotor 152 is maintained in a stationary or non-rotating condition while the first rotary clutch portion 50 rotates.

It will be appreciated that while the driven accessory 10 has been described above and illustrated in the accompanying drawings as employing a clutch assembly 16 that is configured to transmit rotary power in its "normal" or unpowered state, the teachings of the present disclosure have application to other clutch assemblies and driven accessories. For example, the clutch assembly could be configured such that the armature 202 is biased into contact with the coil housing 210 (e.g., via a spring disposed between the actuator input member 140 and the armature 202) and the drive motor 142 could be configured to move the armature 202 in an axially forward direction to disengage the rear surface 226 of the armature 202 from the rear wall 218 of the coil housing 210. In this example, the coil housing 210 may be formed of a non-ferromagnetic material, such as stainless steel, and the actuator input member 140 may be formed in part or whole from a ferromagnetic material.

Figure 9:
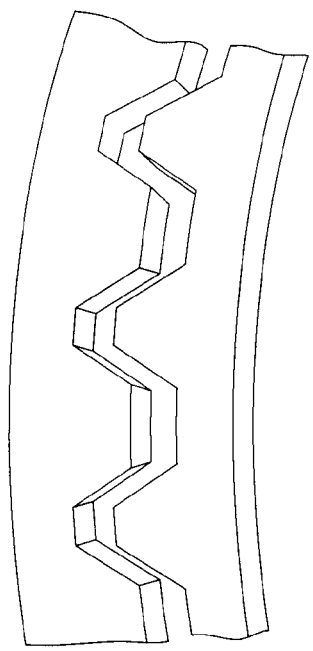
FIGS. 9 through 13 are enlarged portions of various tooth profiles that could be employed in an actuator used in the driven accessory of FIG. 1.
Figure 10:
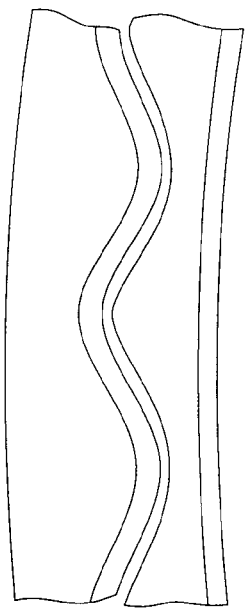
Figure 11:
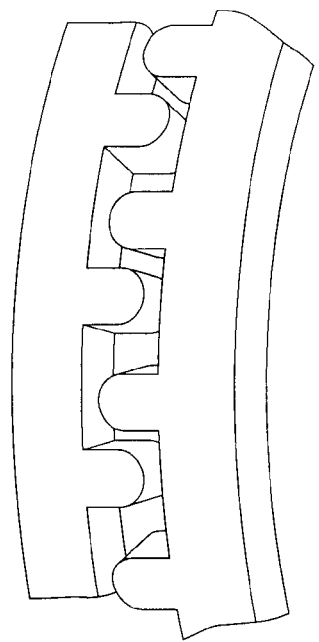
Figure 12:
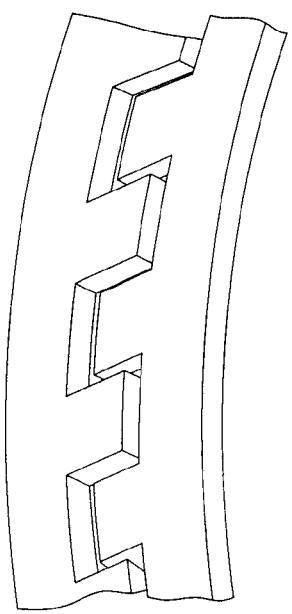
Figure 13:
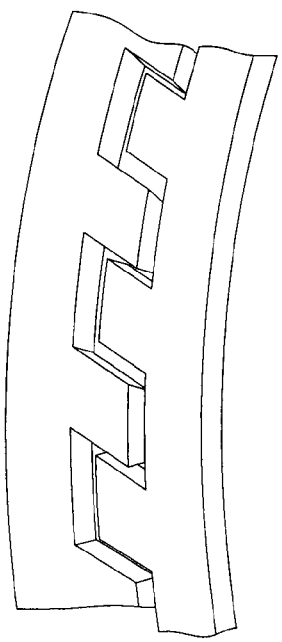

While the teeth T1 and the mating teeth T2 have been illustrated as being face gear teeth with a particular tooth form, it will be appreciated that the teeth T1 and/or the mating teeth T2 could be formed somewhat differently. For example, one of the teeth T1 and the mating teeth T2 can comprise spur gear teeth, while the other one of the teeth T1 and the mating teeth T2 can comprise face gear teeth that are meshingly engaged with the spur gear teeth. Moreover, while the teeth T1 and the mating teeth T2 have been illustrated as having tooth profiles having generally flanks that contact one another in planes (i.e., contact planes) that extend radially through the rotational axis, it may be desirable in some situations to provide different tooth profiles that provide contact planes that are angled relative to the rotational axis to resist or permit free axial movement of the brake shoe 144 relative to the brake rotor 152 and/or to help control noise or vibration due to the meshing of the two parts. Examples of different tooth profiles are depicted in FIG. 9, in which the teeth T1 and mating teeth T2 have generally triangular tooth profiles, FIG. 10, in which the teeth T1 and the mating teeth T2 have generally sinusoidal tooth profiles, FIG. 11, in which the teeth T1 and mating teeth T2 have generally semi-circular tooth profiles, FIG. 12, in which the teeth T1 and the mating teeth T2 have a helical profile that is configured to draw the brake shoe 144 axially toward the brake rotor 152, and FIG. 13, in which the teeth T1 and the mating teeth T2 have a helical profile that is configured to urge the brake shoe 144 axially away from the brake rotor 152. While the teeth T1 and the mating teeth T2 have been illustrated as being external teeth, it will be appreciated that one (i.e., set) of the teeth T1 and the mating teeth T2 could be formed as internal teeth that can meshingly engage the other one of the teeth T1 and the mating teeth T2.

In the example of FIGS. 14 and 15, one or more rolling elements 300, such as bearing balls 302, can be received axially between the teeth T1 and the mating teeth T2. The rolling elements 300 can be formed of any suitable material, such as metal (e.g., steel), plastic and/or ceramic. Each of the rolling elements 300 can be positioned on an axial end face 310 of one of the teeth T1 and on an axial end face 312 of a corresponding valley V between an adjacent pair of the mating teeth T2. In the particular example provided, the axial end faces 310 and 312 are ramped or tapered in a mating way that permits the rolling elements 300 to wedge between the brake shoe 144 and the brake rotor 152 before the flanks F of the teeth T1 and the mating teeth T2 contact one another. The wedging action provided by the tapered axial end faces 310 and 312 and the rolling elements 300 can reduce the effort that is needed to drive the rear surface 226 of the armature 202 into contact with the front surface 228 of the rear wall 218 of the coil housing 210 so that a relatively smaller electromagnetic coil 200 may be employed.

Figure 16:
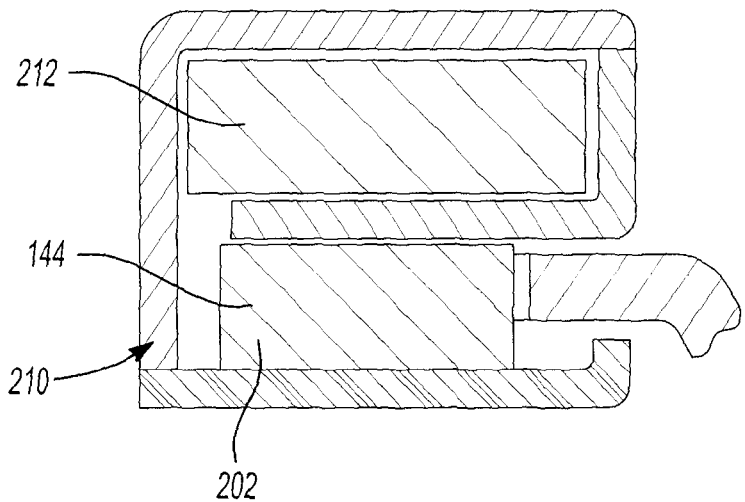
FIG. 16 is an enlarged longitudinal section view of a portion of a third accessory constructed in accordance with the teachings of the present disclosure.

While the brake shoe 144 has been depicted as being disposed radially outwardly of the coil of wire 212, it will be appreciated that the brake shoe 144 could be smaller in diameter than the coil of wire 212 as illustrated in FIG. 16 such that the armature 202 is slidably received within the coil of wire 212. It will be appreciated that in the example of FIG. 16, portions of the coil housing 210 could be formed of a non-magnetic material, such as aluminum, stainless steel or plastic, as desired.

Figure 17:
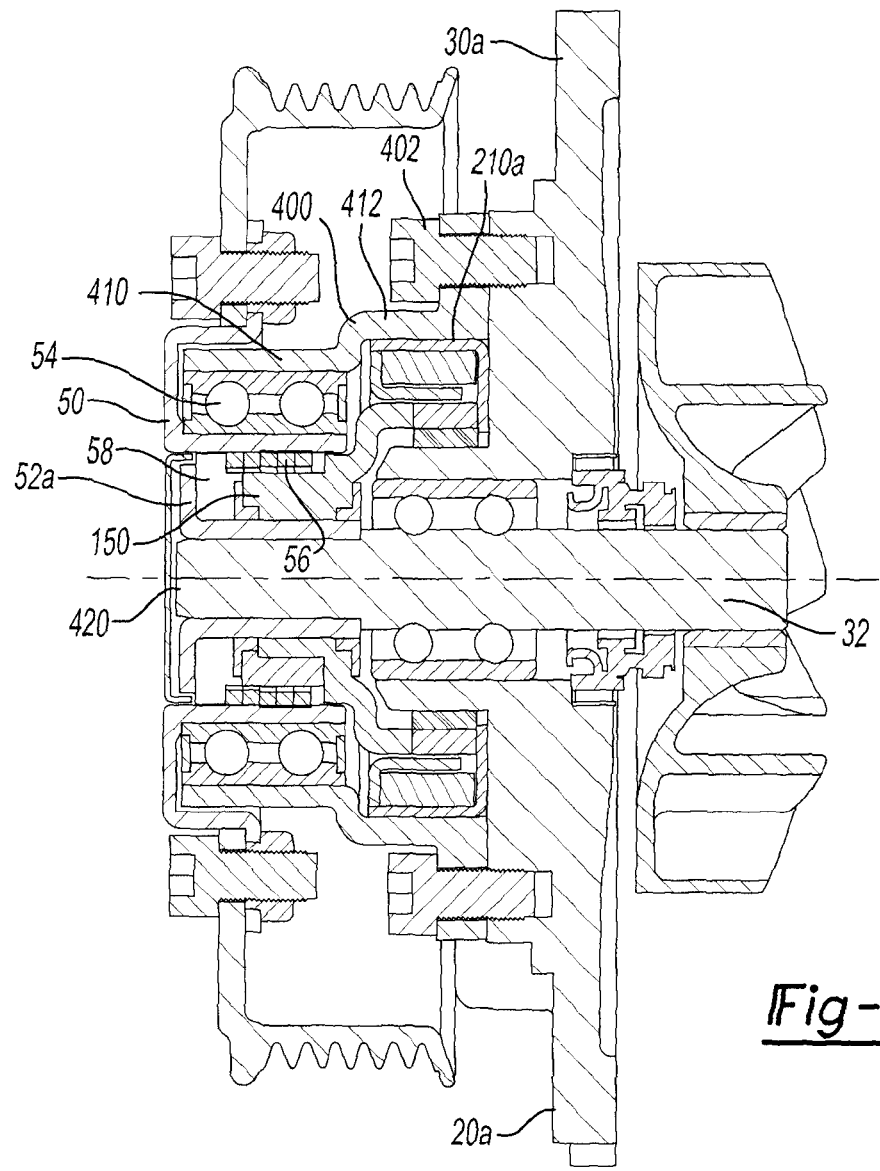
FIG. 17 is a longitudinal section view of a portion of a fourth driven accessory constructed in accordance with the teachings of the present disclosure.

The example of FIG. 17 is generally similar to the example of FIG. 1, except that the actuator 60 is assembled to a bracket 400 and the bearing 54 is mounted on its outer surface to the bracket 400 rather than an inner annular wall 92 (FIG. 5) of the second rotary clutch portion 52 (FIG. 5). The bracket, which can be assembled to the housing 30a of the water pump 20a via a plurality of threaded fasteners 402, can comprise a bearing mount 410, which can be configured to receive the bearing 54, and a coil mount 412 that can be configured to receive the coil housing 210a. Rotary power transmitted from the first clutch portion 50 through the wrap spring 56 (and optionally the carrier 58) into the second rotary clutch portion 52a, which is drivingly coupled to the input shaft 32. In the particular example provided, the first and second rotary clutch portions 50 and 52a cooperate to confine the wrap spring 56 and the carrier 58 so that no bearings are required between the first and second rotary clutch portions 50 and 52*a*. A cover 420 can be employed to seal the cavity defined by the first rotary clutch portion 50.

Figure 18:
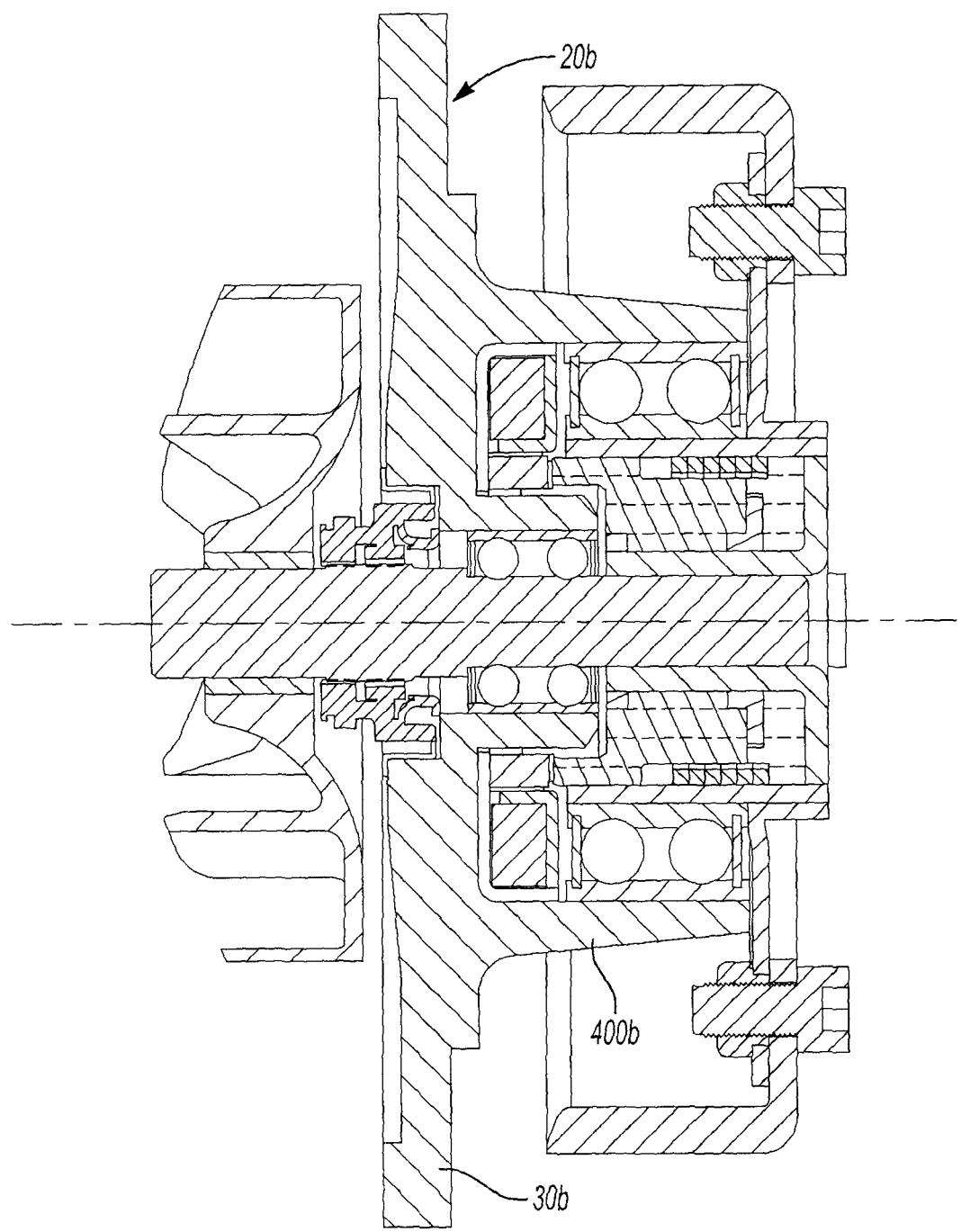
FIG. 18 is a longitudinal section view of a portion of a fifth driven accessory constructed in accordance with the teachings of the present disclosure.

With reference to FIG. 18, it will be appreciated that the bracket 400*b* could be integrally formed with the housing 30*b* of the water pump assembly 20*b* in the alternative.

Figure 19:
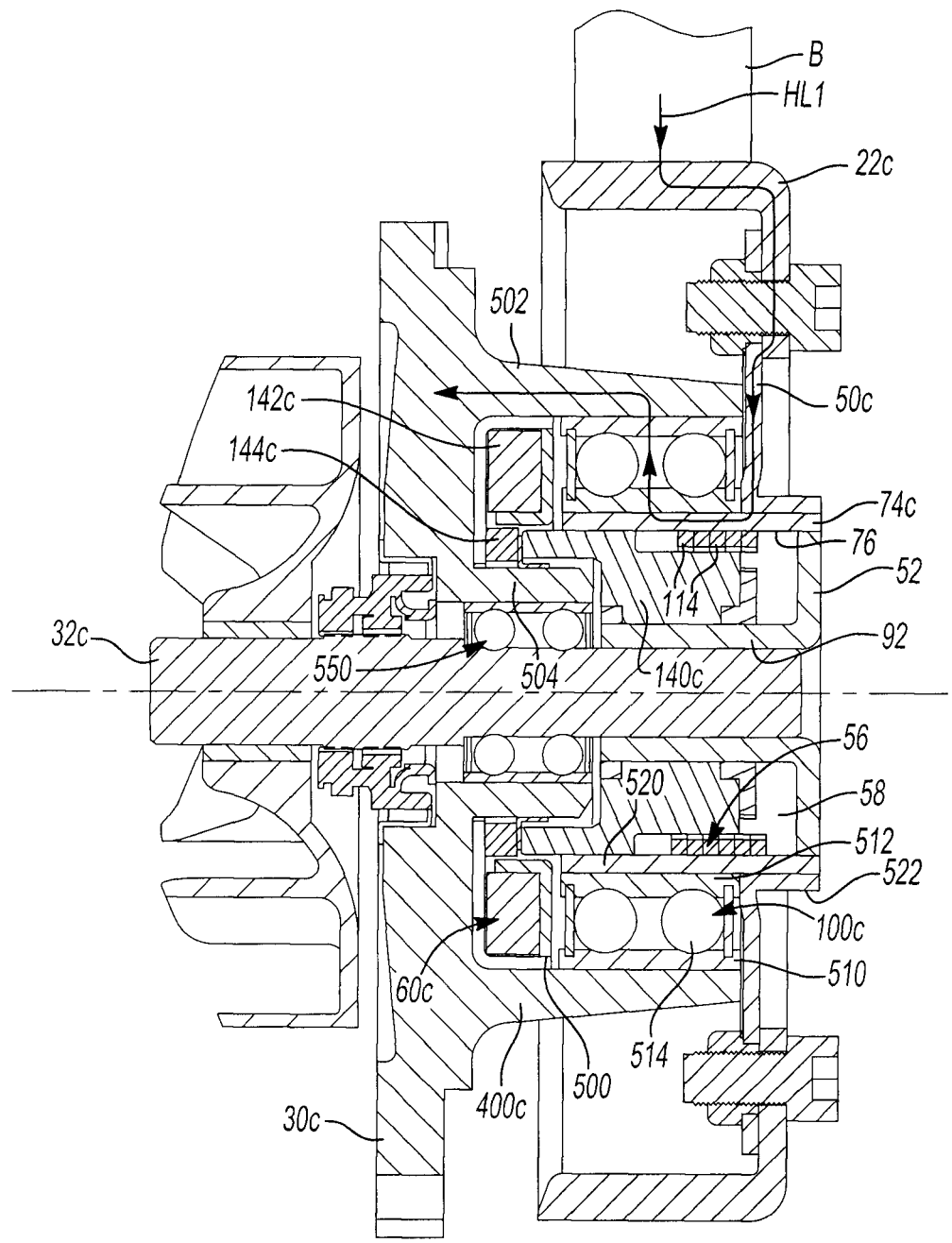
FIG. 19 is a longitudinal section view of a portion of a sixth driven accessory constructed in accordance with the teachings of the present disclosure.

The example of FIG. 19 is generally similar to that of FIGS. 17 and 18 in that the actuator 60*c* is assembled to a bracket 400*c* (shown integrally formed with the water pump housing 30*c* in the particular example provided). The bracket 400*c* can define an annular cavity 500 that can be bounded on its radially outer and inner sides by a first or outer annular wall 502 and a second or inner annular wall 504, respectively. The drive motor 142*c* and the brake shoe 144*c* of the actuator 60*c* can be received in the annular cavity 500. The bearing 100*c* can have an outer bearing race 510, which can be non-rotatably engaged (e.g., press-fit) to the outer annular wall 502, an inner bearing race 512, which can be non-rotatably engaged (e.g., press-fit) to the drive member 74*c*, and a plurality of balls 514 disposed radially between the outer and inner bearing races 510 and 512. The drive member 74*c* can be formed of a sleeve member 520 and a sheave spacer 522 that can couple the sleeve member 520 to the pulley sheave 22*c*. The drive member 74*c* can have an interior clutch surface 76*c* that can be engaged by a wrap spring 56. The actuator input member 140*c* can be rotatable in a manner similar to that which is described above for the previous embodiments such that rotation of the actuator input member 140*c* in a predetermined direction relative to the second end of the wrap spring 56 causes coiling of the helical coils 114.

Figure 20:
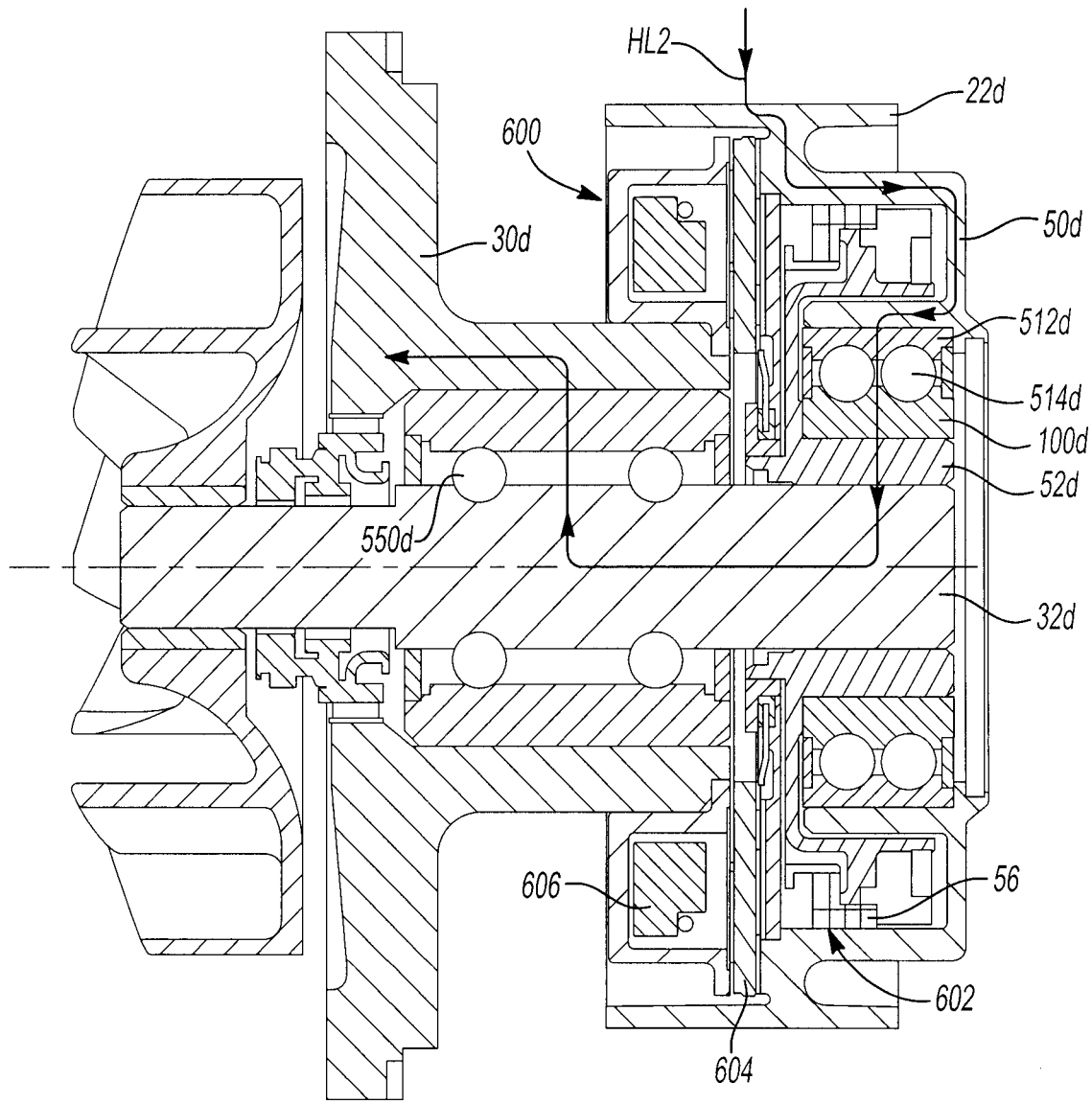
FIG. 20 is a longitudinal section view of portion of a seventh driven accessory constructed in accordance with the teachings of the present disclosure.

In comparison to the arrangement of FIG. 20 in which the actuator 600 for operating the clutch assembly 602 comprises an annular armature 604 that is selectively moved by an electromagnetic coil 606 to selectively engage the clutch assembly 602, the arrangement of FIG. 19 has several advantages. One advantage concerns the manner in which the hub load torque is transmitted to the housing of the water pump. In the example of FIG. 19, the (concentrated) hub load, which is schematically depicted by the line HL1, results from tension on the belt B that acts on the pulley sheave 22*c* to pivot or pull the pulley sheave 22*c* about its rotational axis. The hub load HL1, which is depicted as acting along a centerline of the belt B, is directed through the pulley sheave 22*c*, to first rotary clutch portion 50*c*, through the bearing 100*c*, to the outer annular wall 502 of the bracket 400*c* and into the housing 30*c* of the water pump assembly at a location corresponding to the axial center of the bearing 100*c*. It will be appreciated that none of the hub load HL1 is transmitted between the input shaft 32*c* of the water pump assembly and the shaft bearing 550 that supports the input shaft 32*c* for rotation relative to the housing 30*c*. Moreover, the bearing 100*c* can overlap the shaft bearing 550 in an axial direction (along the rotational axis of the input shaft 32*c*). In contrast, the arrangement that is depicted in FIG. 20 routes the hub load HL2 through the pulley 22*d*, the first rotary clutch portion 50*d*, the clutch bearing 100*d*, the second rotary clutch portion 52*d*, the input shaft 32*d*, the shaft bearing 550*d* and into the housing 30*d*. Because the shaft bearing 550*d* carries the hub load HL2, the shaft bearing 550*d* is sized relatively larger than the shaft bearing 550 in the example of FIG. 19. It will be appreciated that larger bearings typically cost more, weigh more, and are more difficult to package into a water pump relative to smaller bearings.

A second advantage relates to the clutch bearing. In the example of FIG. 19, the clutch bearing 100*c* is arranged such that it supports the rotating portion of the clutch assembly (i.e., the drive member 74*c*) via the inner bearing race 512, whereas in the example of FIG. 20, the clutch bearing 100*d* supports the rotating portion of the clutch assembly (i.e., the first rotary clutch portion 50*c*) via the outer bearing race 512*d*. Those of skill in the art will appreciate that the clutch bearing 100*c* of FIG. 19 will tend to have a longer life than the clutch bearing 100*d* of FIG. 20 because the surface speed of the inner bearing race 512 of FIG. 19 will be lower than the surface speed of the outer bearing race 512*d* of FIG. 20 for a given speed of the pulley sheave.

Yet another advantage relates to the relatively smaller couple that is generated by the hub load and applied to the bearing that supports the first rotary clutch portion for rotation (i.e., the clutch bearing). In the example of FIG. 19, the distance between the location where the (concentrated) hub load HL1 enters the pulley sheave 22*c* and the (concentrated) hub load HL1 enters the bearing 100*c* can be sized in a relatively small manner due to the flexibility provided by the bracket 400*c*, such as a distance that is less than or equal to 15 mm, preferably less than or equal to 10 mm and more preferably less than or equal to 5 mm. In the particular example provided, the offset between the points at which the (concentrated) hub load enters the pulley sheave 22*c* and the bearing 100*c* is 1 mm and as such, the couple produced by the hub load (HL1) is relatively small. In contrast, the offset between the points at which the (concentrated) hub load HL2 enters the pulley 22*d* and the clutch bearing 100*d* in the example of FIG. 20 is comparatively large (approximately 13.5 mm in the example provided) due to the fact that significant portions of the driven device are positioned in front of the housing 30*d* (e.g., the second rotary clutch portion 52*d*, the clutch bearing 100*d*, the wrap spring 56). Moreover, because the clutch bearing 100*d* is positioned axially forwardly of the housing 30*d* (thereby increasing the torque that acts on the input shaft 32*d*) and because the hub load HL2 is directed into the housing 30*d* via the shaft bearing 550*d*, the shaft bearing 550*d* must be sized to account for the torque on the input shaft 32*d* in addition to the force of the hub load HL2.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

LISTING OF ELEMENTS

| | |
|---|---|
| driven accessory | 10 |
| input member | 12 |
| accessory portion | 14 |
| clutch assembly | 16 |
| water pump assembly | 20 |
| water pump assembly | 20b |
| pulley sheave | 22 |
| pulley sheave | 22c |
| pulley | 22d |
| housing | 30 |
| housing | 30b |
| housing | 30c |
| input shaft | 32 |
| input shaft | 32c |
| input shaft | 32d |
| bearing set | 34 |
| seal system | 36 |
| impeller | 38 |
| input end | 40 |
| output end | 42 |
| first rotary clutch portion | 50 |
| first rotary clutch portion | 50c |
| first rotary clutch portion | 50d |
| second rotary clutch portion | 52 |
| second rotary clutch portion | 52a |
| second rotary clutch portion | 52d |
| bearing | 54 |
| wrap spring | 56 |
| carrier | 58 |
| actuator | 60 |
| actuator | 60c |
| rotary axis | 70 |
| drive member | 74 |
| drive member | 74c |
| interior clutch surface | 76 |
| interior clutch surface | 76c |
| tubular hub | 78 |
| radial flange | 80 |
| threaded fastener | 82 |
| outer annular wall | 90 |
| inner annular wall | 92 |
| drive lug | 94 |
| end wall | 96 |
| bearing element | 100a |
| bearing element | 100b |
| bearing | 100c |
| bearing | 100d |
| first end | 110 |
| second end | 112 |
| helical coils | 114 |
| tang | 118 |
| flange portion | 120 |
| sleeve portion | 122 |
| groove | 124 |
| carrier abutment wall | 126 |
| front surface | 130 |
| rear surface | 132 |
| abutting face | 138 |
| actuator input member | 140 |
| actuator input member | 140c |
| axial end face | 142 |
| drive motor | 142 |
| drive motor | 142c |
| brake shoe | 144 |
| brake shoe | 144c |
| hub member | 150 |
| brake rotor | 152 |
| spring mount | 156 |
| slot | 158 |
| rotor surface | 160 |
| O-ring seal | 170 |
| seal groove | 172 |
| O-ring seal | 176 |
| thrust ring | 180 |
| retaining ring | 182 |
| ring groove | 184 |
| electromagnetic coil | 200 |
| armature | 202 |
| coil housing | 210 |
| coil housing | 210a |
| coil of wire | 212 |
| inner housing wall | 214 |
| outer housing wall | 216 |
| rear wall | 218 |
| forward end | 220 |
| rear surface | 226 |
| rolling element | 300 |
| bearing ball | 302 |
| axial end face | 310 |
| axial end face | 312 |
| bracket | 400 |
| bracket | 400b |
| bracket | 400c |
| fasteners | 402 |
| bearing mount | 410 |
| coil mount | 412 |
| cover | 420 |
| annular cavity | 500 |
| outer annular wall | 502 |
| inner annular wall | 504 |
| outer bearing race | 510 |
| inner bearing race | 512 |
| balls | 514 |
| sleeve member | 520 |
| sheave spacer | 522 |
| shaft bearing | 550 |
| shaft bearing | 550d |
| actuator | 600 |
| clutch assembly | 602 |
| armature | 604 |
| electromagnetic coil | 606 |
| belt | B |
| hub load | HL1 |
| hub load | HL2 |
| plastic material | PM |
| steel filler material | SFM |
| steel ring | SR |
| teeth | T1 |
| mating teeth | T2 |
| valley | V |

What is claimed is:

1. A driven accessory comprising:
a first rotary clutch portion that is disposed about a rotary axis and adapted to receive a rotary input, the first rotary clutch portion defining a clutch surface;
a second rotary clutch portion that is disposed about the rotary axis and adapted to be coupled to an input shaft;
a wrap spring having a first end, a second end and a plurality of helical coils between the first end and the second end, the plurality of helical coils engaging the clutch surface, the wrap spring being configured to selectively transmit rotary power between the first rotary clutch portion and the second rotary clutch portion, the rotary power being received by the helical coils from the first rotary clutch portion and being transmitted through the first end; and
an actuator that is selectively operable for generating a drag force that is applied to the second end of the wrap spring, the actuator comprising an actuator input member and a brake shoe, the actuator input member being rotatable about the rotary axis relative to the first rotary clutch portion and having a brake rotor with a plurality of first teeth that are disposed circumferentially about the brake rotor, the brake shoe comprising a plurality of second teeth that are meshingly engaged to the first teeth of the brake rotor, the brake shoe being rotatable about and axially movable along the rotary axis.

2. The driven accessory of claim 1, further comprising a motor that is configured to translate the brake shoe.

3. The driven accessory of claim 2, wherein the motor is a linear motor.

4. The driven accessory of claim 3, wherein the linear motor comprises a coil of wire and an armature.

5. The driven accessory of claim 4, wherein the brake shoe is overmolded onto at least a portion of the armature.

6. The driven accessory of claim 4, wherein the armature is formed of a plastic material having a ferromagnetic filler material.

7. The driven accessory of claim 4, wherein the coil of wire is mounted on a bracket and wherein the armature is received within the coil of wire.

8. The driven accessory of claim 1, wherein at least one rolling element is received between the first teeth and the second teeth.

9. The driven accessory of claim 8, wherein the first teeth have first axial end faces, wherein the second teeth have second axial end faces and wherein the at least one rolling element abuts the first and second axial end faces.

10. The driven accessory of claim 9, wherein the first and second axial end faces are tapered.

11. The driven accessory of claim 1, wherein the first teeth and the second teeth have pressure angles that are less than 90 degrees.

12. A driven accessory comprising:
a first rotary clutch portion that is disposed about a rotary axis and adapted to receive a rotary input, the first rotary clutch portion defining a clutch surface;
a second rotary clutch portion that is disposed about the rotary axis and adapted to be coupled to an input shaft;
a wrap spring having a first end, a second end and a plurality of helical coils between the first end and the second end, the plurality of helical coils engaging the clutch surface, the wrap spring being configured to selectively transmit rotary power between the first rotary clutch portion and the second rotary clutch portion, the rotary power being received by the helical coils from the first rotary clutch portion and being transmitted through the first end; and
an actuator that is selectively operable for generating a drag force that is applied to the second end of the wrap spring, the actuator comprising an actuator input member, a brake shoe and a motor, the actuator input member being rotatable about the rotary axis relative to the first rotary clutch portion and having a brake rotor, the brake shoe being rotatable about and movable axially along the rotary axis, the motor being selectively operable to translate the brake shoe axially along the rotary axis, wherein the drag force is generated when the motor is operated in a first mode so that transmission of rotary power between the first rotary clutch portion and the second rotary clutch portion is interrupted, and wherein the drag force is not generated when the motor is operated in a second mode to permit transmission of rotary power between the first rotary clutch portion and the second rotary clutch portion.

13. The driven accessory of claim 12, wherein the motor is a linear motor.

14. The driven accessory (10) of claim 13, wherein the linear motor comprises a coil of wire (212) and an armature (202).

15. The driven accessory of claim 12, wherein the actuator input member comprises a plurality of first teeth and the brake shoe comprises a plurality of second teeth that are meshingly engaged to the first teeth.

16. The driven accessory of claim 15, wherein at least one rolling element is received between the first teeth and the second teeth.

17. A driven accessory comprising:
an accessory portion having a housing, an input shaft and a shaft bearing that supports the input shaft for rotation in the housing; a bracket coupled to the housing;
a first rotary clutch portion that is disposed about a rotary axis and adapted to receive a rotary input, the first rotary clutch portion defining a clutch surface;
a second rotary clutch portion that is disposed about the rotary axis and coupled to the input shaft;
a wrap spring having a first end, a second end and a plurality of helical coils between the first end and the second end, the plurality of helical coils engaging the clutch surface, the wrap spring being configured to selectively transmit rotary power between the first rotary clutch portion and the second rotary clutch portion, the rotary power being received by the helical coils from the first rotary clutch portion and being transmitted through the first end;
an actuator that is selectively operable for generating a drag force that is applied to the second end of the wrap spring, the actuator comprising an actuator input member and a brake shoe, the actuator input member being rotatable about the rotary axis relative to the first rotary clutch portion and having a brake rotor with a plurality of first teeth that are disposed circumferentially about the brake rotor, the brake shoe comprising a plurality of second teeth that are meshingly engaged to the first teeth (T1) of the brake rotor, the brake shoe being rotatable about and axially movable along the rotary axis; and
a clutch bearing that supports the first rotary clutch portion for rotation relative to the bracket, the clutch bearing being received in the bracket.

18. The driven accessory of claim 17, wherein the clutch bearing overlaps the shaft bearing in an axial direction along a rotational axis of the input shaft.

19. The driven accessory of claim 17, wherein the first rotary clutch portion is coupled for rotation with a pulley sheave that is configured to engage an endless power transmitting element, wherein a centerline of the endless power transmitting element is disposed less than or equal to 15 mm of the axial center of the clutch bearing.

20. The driven accessory of claim 17, further comprising a pulley sheave coupled to the first rotary clutch portion, the pulley sheave being configured to engage an endless power transmitting element, wherein the endless power transmitting element applies a hub load to the pulley sheave, and wherein no portion of the hub load is transmitted through the shaft bearing to the housing.

* * * * *